3,406,157
POLYMERIZATION OF VINYL CHLORIDE IN THE PRESENCE OF AMMONIA COMPLEX OF A LOWER TRIALKYLBORON AS CATALYST THEREFOR
Georgette Steinbach, Paris, France, assignor to Compagnie de Saint-Gobain, Neuilly-sur-Seine, France
No Drawing. Filed June 9, 1961, Ser. No. 126,756
Claims priority, application France, June 23, 1960, 830,954
8 Claims. (Cl. 260—87.5)

This invention relates to improvements in the polymerization of vinyl chloride and in the copolymerization of the same with monomers comprising at least one ethylenic double bond. It is an improvement over known processes of polymerizing and copolymerizing the same monomers by classic methods, depends upon a novel catalysis, and is particularly applicable to the polymerization of vinyl chloride and to the copolymerization of vinyl chloride with certain related and compatible vinyl compounds.

Numerous catalysts for the polymerization of vinyl monomers are known and among them are the alkylborons, the use of which is made difficult because they burn on contact with air and because, while they work well in glass vessels, in the presence of metal such as the stainless steel which constitutes the material of most industrial apparatus, the polymerization is irregular and even totally inhibited, as it is in the case of vinyl chloride.

It is an object of the invention to polymerize vinyl chloride alone or in the persence of known monomers having a polymerizable ethylenic double bond by the aid of a novel catalyst. Another object is to polymerize such monomers in vessels such as stainless steel which tend to inhibit polymerization or to negative the catalytic properties of known catalysts. A particular object concerns the polymerization of vinyl chloride, alone or in the presence of polymerizable monomers having at least one vinylic double bond, in stainless steel autoclaves.

The objects of the invention are accomplished, generally speaking, by a method of polymerizing vinyl chloride alone or in the presence of monomers having at least one unsaturated ethylenic double bond which comprises subjecting it to conditions of temperature and pressure favorable to polymerization in the presence of a catalytic quantity of the ammonia complex of one or more lower trialkylboron. In these catalysts the alkyl groups are preferably lower alkyl and the simpler members of that group are technically satisfactory and less costly than the higher members. These novel catalysts have the empirical formula $R_3B:NH_3$ in which R is lower alkyl; lower alkyl is preferably methyl, ethyl, propyl, or butyl, and in which the use of alkyl of over 6 C. atoms is not recommended.

The invention with respect to polyvinyl chloride consists in carrying out the polymerization or copolymerization of that substance in the presence of a catalytic amount of at least one of the ammonia complexes of trialkylboron, which are sometimes called trialkylboronmonoamines and which have the general formula $$R_3\overset{-}{B}:\overset{+}{N}H_3$$

in which R represents an alkyl radical.

Among the unsaturated ethylenic monomers which can be copolymerized with vinyl chloride in the presence of these novel catalysts, are vinyl acetate, hexyl acrylate, allyl chloride, monochlorotrifluoroethylene, ethylene and propylene.

The ammonia complexes of trialkylboron which are particularly valuable in the present use are those in which the R groups attached to boron are of low molecular weight such as methyl, ethyl and butyl.

The new catalysts are made by adding ammonia to the selected trialkylboron. Thus, for example, one may prepare borontrimethylmonoamine in a nitrogen atmosphere by passing dry ammonia into liquefied trimethylboron. The trimethylboron may be prepared by reacting methyl magnesium iodide on an etherolate of borontrifluoride. This produces a white solid which is purified by heating and distillation. The pure product has a boiling point of 104° C. and a melting point of 77° C.; it differs from the trialkylborons in that it is not ignited by air at room temperature. It has the formula given above, R being methyl.

Borontriethylmonoamine is produced similarly and is a slightly viscous liquid boiling at 58° C. at a pressure of 14 mm. mercury. This catalyst is obtained with a yield of 98% of the weight of the triethylboron from which it is made.

The name borontrialkylmonoamine appears to be adequately descriptive, although these compounds do not appear to be true amines as appear to contain the group $NH_3$ rather than the group $NH_2$. The term will be used for convenience in the body of the specification, leaving the exact composition of the novel compounds for later determination. The same process of manufacture is used when it is desired to substitute heavier alkyl groups on the boron.

These ammonia complexes of trialkylboron are not spontaneously combustible at room temperature, they have good stability and their use is easy, their stability being confirmed by infra red spectrum study after extensive storage.

The catalysts of this invention have a catalytic activity which is not reduced by the passage of time. Their efficiency is particularly high over an extensive range of temperatures and accomplishes the polymerization or copolymerization in metallic apparatus without fear of inhibition of the catalysis or the polymerization. They are equally applicable to all polymerization techniques such as to polymerization in mass, to polymerization in solution, in organic solvents in which the polymer is insoluble in aqueous medium, in suspension, in emulsion in the presence of emulsifiers of the usual sorts. The new catalysts are advantageously employed in quantities which are recognizable as catalytic, that is to say between about .01 and .2% by weight based on the weight of the monomer. These catalysts are more useful than the catalysts of classic type, the quantities used being notably reduced and the thermal stability of the resulting polymer being improved. It is a substantial advantage of this invention that the new catalysts improve the thermal stability of the polymers which are produced by its action between about 10 to about 25% under ordinary conditions.

The following examples illustrate the invention without limitation on the generality of what is elsewhere herein stated and claimed:

Example 1

Into a stainless steel autoclave of vertical type having a capacity of 3 liters made of stainless steel 18/8, furnished with an agitator and a water jacket for heating, one puts .0075 mole of borontriethylmonoamine, sweeps the autoclave with a current, introduces 1500 grams of vinyl chloride and adjusts the pressure to 8.3 kg. cm.² and the temperature at 55°C. After 5 hours and 30 minutes the autoclave is cooled and the gases are discharged. The product withdrawn is a powdery resin having a faint odor. The total transformation was 56% by weight and the hourly yield was 10%.

A test was run under like conditions but using .0075 mole of triethylboron in place of the ammoniacal complex and there was produced only an insignificant quantity of powdery resin which, when exposed to the air produced dispersed tongues of flame. The total polymerization was only 3.4% by weight and the hourly yield .6%.

Example 2

.96 gram of borontriethylmonoamine was put into a stainless steel autoclave of 10 liters capacity furnished with an agitator and a water jacket. The apparatus was swept by a current of nitrogen and 4800 grams of vinyl chloride were admitted. The polymerization was carried out for 5 hours and 30 minutes at 9 kg./cm² at a temperature of 60°C. After cooling and release of gases there were recovered 2240 grams of white powder corresponding to an hourly yield of 8.5%.

In the same autoclave there was polymerized vinyl chloride under identical conditions using azoiosobutyronitrile as a catalyst. In order to achieve the same hourly rate of transformation it was necessary to use 3.84 grams of the catalyst or four times more than of borontriethylmonoamine.

The thermal stability of the resins produced was compared after preliminary treatment with lead stearate, by measuring their resistance under equal pressure to a temperature of 200°C. The resin produced by this invention was 15 to 20% more stable than that produced by the use of the azo catalyst, and pressure resistance extended about 25 minutes in the case of this invention and 17 to 20 minutes in the case of the azo catalyst.

Example 3

A 3 liter stainless steel autoclave was used having a vertical agitator and a hot water heating and cooling system. The apparatus was cleaned by a current of nitrogen and 1500 grams of vinyl chloride and .152 gram of borontrimethylmonoamine were added. The polymerization took 6 hours and 30 minutes at 55°C. with a pressure of 7.8 kg./cm.². After cooling and decompression 240 grams of polymer powder were obtained, representing a mean hourly conversion of 2.45%.

Example 4

Into the same autoclave as that used in Example 3 there were introduced, after replacing gases with nitrogen, 1425 grams of vinyl chloride, 75 grams of vinyl acetate, representing a ratio of 95 to 5, and .24 gram of borontriethylmonoamine. The reaction of polymerization took 6 hours and 30 minutes at 55°C. and 5.9 kg./cm.². After cooling and release of gases there were recovered 300 grams of copolymer of composition 98 to 2. The hourly mean rate of transformation was 3%.

Example 5

Using the autoclave of Example 3 in the same way 1125 grams of vinyl chloride, 375 grams of monochlorotrifluoroethylene corresponding to a ratio of 75 to 25, and .87 gram of borontriethylmonoamine were added. The copolymerization took 11 hours at 45° C. and a pressure of 7.8 kg./cm². After cooling and degassing 350 grams of copolymer having a composition 89.6 to 10.4 was obtained. The hourly rate was 2.12%. This resin has been used as insulation on electrical cables.

Example 6

Into a high pressure autoclave of stainless steel having a capacity of 4 liters provided with an agitator and a water heating and cooling system there was introduced 1.9 gram of borontriethylmonoamine and, after establishment of a nitrogen atmosphere, 1500 grams of vinyl chloride. The autoclave was connected to a source of ethylene under pressure and there was introduced a quantity such that the pressure attained 40 kg./cm². The temperature was established at 55° C. and after 6 hours at this temperature and pressure the mass was cooled, the autoclave was discharged and a powdery resin was obtained which was creamy white. The yield, calculated in the weight of vinyl chloride used was 30%. The hourly rate of transformation was 5%. The composition of the copolymer was 93.5 to 6.5, polyvinyl chloride to polyethylene.

Example 7

Into an autoclave identical with that described in Example 6 were put, under nitrogen, .8 gram of borontriethylmonoamine, 1500 grams of vinyl chloride and enough propylene to raise the pressure to 9 kg./cm². A temperature of 55° was maintained for 5 hours and 45 minutes. The autoclave was cooled, the pressure was reduced to atmospheric, and 570 grams of a resin powder was obtained having a composition of polyvinyl chloride to polypropylene 98.5 to 1.5. The yield based on the amount of vinyl chloride employed was 38% and the hourly rate of transformation was 7.2%.

Example 8

When the same test was made as in Example 7 but using .5 gram of the same catalyst and enough propylene to raise the pressure to 13.5 kg./cm², the temperature being the same, there was obtained after 6 hours and 45 minutes 125 grams of powdery resin having a composition of polyvinyl chloride to polypropylene of 91 to 9. The mean hourly rate of transformation, calculated with respect to the vinyl chloride used was 1.23%.

As many apparently widely different embodiments of the present invention may be made without departing from the spirit and scope thereof, it is to be understood that the invention is not limited to the specific embodiments.

What is claimed is:

1. A method of polymerizing vinyl chloride which comprises subjecting it to conditions of temperature and pressure favorable to polymerization in contact with the ammonia complex of a lower trialkylboron.

2. A method of copolymerizing vinyl chloride with at least one other monomer, said other monomer being compatible with vinyl chloride and having at least one ethylenically unsaturated double bond, which comprises subjecting the mixture of the monomers to conditions of temperature and pressure favorable to polymerization in contact with the ammonia complex of a lower trialkylboron of the formula $R_3B:NH_3$, in which R is an alkyl group having from 1 to 6 C. atoms.

3. A method of polymerizing a mass comprising vinyl chloride which comprises heating the mass to moderate and sustained temperature in the absence of air at a pressure sufficient to liquefy the vinyl chloride until a substantial degree of polymerization has been attained, said polymerization taking place in contact with the ammonia complex of a lower trialkylboron of the formula $R_3B:NH_3$ in which R is an alkyl group having from 1 to 6 C. atoms.

4. A method of polymerizing a mass comprising vinyl chloride and at least one other monomer, said other monomer being compatible with vinyl chloride, and having at least one ethylenically unsaturated double bond, which comprises heating the mass to moderate and sustained temperature in the absence of reactive gases under pressure adequate to polymerization, and in contact with the ammonia complex of a lower trialkylboron of the formula $R_3B:NH_3$ in which R is an alkyl group having from 1 to 6 C. atoms.

5. A method of polymerizing vinyl chloride which comprises subjecting it to a temperature of from about 45 to 60° C. and a pressure of from about 5 to 15 kg./cm.² in contact with from about .01 to .2% by weight based on the weight of the vinyl chloride of the ammonia complex of a lower trialkylboron of the formula $R_3B:NH_3$ in which R is an alkyl group having from 1 to 6 C. atoms.

6. A method of copolymerizing vinyl chloride with at least one other monomer, said other monomer being compatible with vinyl chloride and having at least one ethylenically unsaturated double bond, which comprises subjecting the monomers to a temperature of from about 45 to 60° C. and a pressure of about 5 to 15 kg./cm.² in contact with from about .01 to .2% by weight based on the weight of the monomers of the ammonia complex of a lower trialkylboron of the formula $R_3B:NH_3$ in which R is an alkyl group having from 1 to 6 C. atoms.

7. A method of polymerizing a mass comprising vinyl chloride which comprises heating the mass to a sustained temperature of from about 45 to 60° C. in the absence of air at a pressure sufficient to liquefy the vinyl chloride until a substantial degree of polymerization has been attained, said polymerization taking place in contact with from about .01 to .2% by weight based on the weight of the vinyl chloride of the ammonia complex of a lower trialkylboron of the formula $R_3B:NH_3$ in which R is an alkyl group having from 1 to 6 C. atoms.

8. A method of polymerizing a mass comprising vinyl chloride and at least one other monomer, said other monomer being compatible with vinyl chloride and having at least one ethylenically unsaturated double bond, which comprises heating the mass to a sustained temperature of from about 45 to 60° C. in the absence of reactive gases and under pressure adequate to polymerization in contact with from about .01 to .2% by weight based on the weight of the monomers of the ammonia complex of a lower trialkylboron of the formula $R_3B:NH_3$ in which R is an alkyl group having 1 to 6 C. atoms.

References Cited

UNITED STATES PATENTS

| 2,387,517 | 10/1945 | Kraus | 260—92.8 |
| 3,025,284 | 3/1962 | George et al. | 260—92.8 |
| 3,036,048 | 5/1962 | Falkai et al. | 260—92.8 |

OTHER REFERENCES

Smith et al., American Chemical Society Journal, vol. 73 (1951), pp. 2751–2754.

Furukawa et al., Journal of Polymer Science, vol. 26 (1957), pp. 234–236.

JOSEPH L. SCHOFER, *Primary Examiner.*

H. WONG, *Assistant Examiner.*